(12) United States Patent
Vande Velde et al.

(10) Patent No.: US 9,906,690 B2
(45) Date of Patent: Feb. 27, 2018

(54) METHOD FOR CHARACTERIZING A PRINTER

(71) Applicant: AGFA NV, Mortsel (BE)

(72) Inventors: Koen Vande Velde, Mortsel (BE); Marc Mahy, Mortsel (BE)

(73) Assignee: AGFA NV, Mortsel (BE)

( * ) Notice: Subject to any disclaimer, the term of this patent is extended or adjusted under 35 U.S.C. 154(b) by 0 days.

(21) Appl. No.: 15/379,818

(22) Filed: Dec. 15, 2016

(65) Prior Publication Data

US 2017/0180610 A1    Jun. 22, 2017

(30) Foreign Application Priority Data

Dec. 16, 2015 (EP) .................................... 15200382

(51) Int. Cl.
    *H04N 1/60* (2006.01)
(52) U.S. Cl.
    CPC ........... *H04N 1/6055* (2013.01); *H04N 1/605* (2013.01); *H04N 1/6008* (2013.01); *H04N 1/6013* (2013.01); *H04N 1/6033* (2013.01); *H04N 1/6058* (2013.01)
(58) Field of Classification Search
    CPC .. H04N 1/6055; H04N 1/6058; H04N 1/6033; H04N 1/6052; H04N 1/6005; H04N 1/60; H04N 1/64
    See application file for complete search history.

(56) References Cited

U.S. PATENT DOCUMENTS 6,654,143 B1   11/2003  Dalal et al.
8,654,395 B2    2/2014  Bestmann

FOREIGN PATENT DOCUMENTS

WO       2013/124369 A1    8/2013

OTHER PUBLICATIONS

Mahy et al. "Inversion of the Neugebauer Equations", Color research and application, CCC 0361-2317/96/060404-08, 1996, vol. 21, No. 6, pp. 404-411.
Wyszecki et al., "Optical Filters: Absorption Filters", Color Science: Concepts and Methods, Quantitative Data and Formulae, ISBN 0471021067, Physical Data, 1982, pp. 30-31.
Wyszecki et al., "Colorant Formulation", Color Science: Concepts and Methods, Quantitative Data and Formulae, ISBN 0471021067, 1982, pp. 221-222.
Wyszecki et al., "Formulae of the Kubelka-Munk Theory of Colorant Layers", Color Science: Concepts and Methods, Quantitative Data and Formulae, ISBN 0471021067, 1982, pp. 785-786.

(Continued)

*Primary Examiner* — Christopher D Wait
(74) *Attorney, Agent, or Firm* — Keating and Bennett, LLP

(57) ABSTRACT

A standard printer characterization target is printed with a reference printer and measured. From the measured data, a model is derived that describes for each ink the behavior of each individual ink in combination with different combinations of the other inks. In order to reduce the complexity for obtaining a printer model of a second printer, a second target is printed that includes only a subset of the color patches in the standard printer characterization target. With the model and interpolation, it is possible to reconstruct colorimetric data for missing color patches in the reduced target.

3 Claims, 4 Drawing Sheets

(56) References Cited

OTHER PUBLICATIONS

"Graphic technology—Input data for characterization of four-colour process printing—Part 1: Initial data set", ISO/FDIS 12642-1:2011 (E), 2011, 22 pages.

"Graphic technology—Input data for characterization of 4-colour process printing—Part 2: Expanded data set", ISO/DIS 12642-2, 2005, 30 pages.

Littlewood et al., "Maintaining an Accurate Printer Characterization", The 12th Color Imaging Conference: Color Science and Engineering Systems, Technologies, Applications, Nov. 9-12, 2004, 9 pages.

International Color Consortium (ICC), "IFRA characterization data", http://www.color.org/chardata/IFRA.xalter, 1 page.

FIG. 3

Group 300:

| C=10% M=0% Y=0% K=0% | C=20% M=0% Y=0% K=0% | C=40% M=0% Y=0% K=0% | C=60% M=0% Y=0% K=0% | C=80% M=0% Y=0% K=0% | C=100% M=0% Y=0% K=0% |
|---|---|---|---|---|---|
| C=0% M=10% Y=0% K=0% | C=0% M=20% Y=0% K=0% | C=0% M=40% Y=0% K=0% | C=0% M=60% Y=0% K=0% | C=0% M=80% Y=0% K=0% | C=0% M=100% Y=0% K=0% |
| C=0% M=0% Y=10% K=0% | C=0% M=0% Y=20% K=0% | C=0% M=0% Y=40% K=0% | C=0% M=0% Y=60% K=0% | C=0% M=0% Y=80% K=0% | C=0% M=0% Y=100% K=0% |
| C=0% M=0% Y=0% K=10% | C=0% M=0% Y=0% K=20% | C=0% M=0% Y=0% K=40% | C=0% M=0% Y=0% K=60% | C=0% M=0% Y=0% K=80% | C=0% M=0% Y=0% K=100% |

Group 301:

| C=0% M=40% Y=40% K=0% | C=0% M=80% Y=80% K=0% | C=0% M=100% Y=100% K=0% |
|---|---|---|
| C=40% M=0% Y=40% K=0% | C=80% M=0% Y=80% K=0% | C=100% M=0% Y=100% K=0% |
| C=40% M=40% Y=0% K=0% | C=80% M=80% Y=0% K=0% | C=100% M=100% Y=0% K=0% |
| C=100% M=0% Y=0% K=100% | C=0% M=100% Y=0% K=100% | C=0% M=0% Y=100% K=100% |

Group 302:

| C=0% M=0% Y=0% K=0% | C=40% M=27% Y=27% K=0% |
|---|---|
| C=5% M=3% Y=3% K=0% | C=60% M=45% Y=45% K=0% |
| C=10% M=6% Y=6% K=0% | C=80% M=65% Y=65% K=0% |
| C=20% M=12% Y=12% K=0% | C=100% M=85% Y=85% K=0% |

Group 303:

| C=20% M=100% Y=100% K=0% | C=100% M=20% Y=100% K=0% | C=100% M=100% Y=20% K=0% |
|---|---|---|
| C=0% M=100% Y=100% K=20% | C=100% M=0% Y=100% K=20% | C=100% M=100% Y=0% K=20% |
| C=0% M=100% Y=100% K=100% | C=100% M=0% Y=100% K=100% | C=100% M=100% Y=0% K=100% |

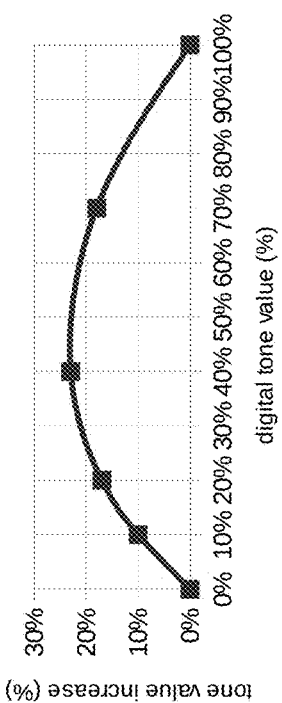
FIG. 5
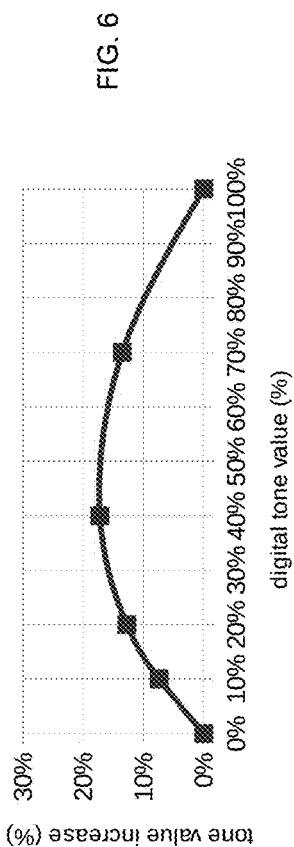
FIG. 6
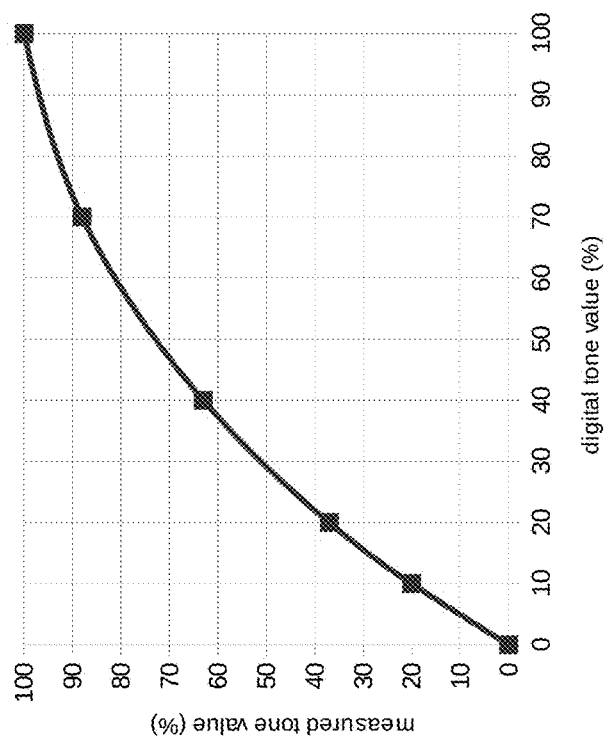
FIG. 4
| 273 | 3D1 | 40.0000 | 0.0000 | 20.0000 | 0.0000 | 33.7700 | 40.0100 | 31.7500 | 69.4767 | -15.9889 | 1.8910 |
| 274 | 3D2 | 40.0000 | 10.0000 | 20.0000 | 0.0000 | 31.2900 | 35.2900 | 28.9200 | 65.9738 | -9.7384 | 0.3093 |
| 275 | 3D3 | 40.0000 | 20.0000 | 20.0000 | 0.0000 | 28.9200 | 30.9900 | 26.3000 | 62.4992 | -3.6652 | -1.2872 |
| 276 | 3D4 | 40.0000 | 40.0000 | 20.0000 | 0.0000 | 25.2400 | 24.6100 | 22.1000 | 56.6934 | 6.5145 | -3.5984 |
| 277 | 3D5 | 40.0000 | 70.0000 | 20.0000 | 0.0000 | 21.7200 | 18.8200 | 17.8000 | 50.4759 | 17.6950 | -5.3462 |
FIG. 7

METHOD FOR CHARACTERIZING A PRINTER

CROSS REFERENCE TO RELATED APPLICATIONS

This application claims the benefit of European Application No. 15200382.8, filed Dec. 16, 2015, which is incorporated by reference herein in its entirety.

BACKGROUND OF THE INVENTION

1. Field of the Invention

The invention relates to color management in the context of printing. More specifically, the invention relates methods for characterizing the color mixing behavior of printers.

2. Description of the Related Art

Separation of Color into a Colorant Set

Color images are typically captured and stored in a colorimetric color space, such as for example an RGB color space or more specifically an sRGB color space.

With color space is meant a space that represents a number of quantities of an object that characterize its color. In most practical situations, colors will be represented in a 3-dimensional space such as the CIE XYZ space, CIELAB or CIECAM02. However, also other characteristics can be used such as multispectral values based on filters that are not necessarily a linear transformation of the color matching functions. The values represented in a color space are referred to as color values. Color spaces are also referred to as device independent spaces.

With colorant space is meant an n-dimensional space with n the number of independent variables with which the color device can be addressed. In the case of an offset printing press the dimension of the colorant space corresponds to the number of inks of the press. As normally CMYK inks are used, the dimension of the colorant space is four. Colorant spaces are also referred to as device dependent spaces.

The colorant domain is defined by all possible combinations of colorant values, ranging from 0% to 100%. If there are no extra colorant limitations, the colorant domain is an n-dimensional cube, defined by the boundary planes with one ink equal to 0 or 100%. However, in most cases also one or multiple ink limitations have to be taken into account as a number of colorant combinations are not acceptable to be printed. Hence the colorant domain is reduced by these ink limitations. Most commonly these ink limitations are expressed as a set of linear inequalities that constraint the colorant domain. In general the colorant domain of the n-dimensional colorant space is defined by $2 \cdot n + s$ hyperplanes; i.e. $2 \cdot n$ boundary planes plus a number of s linear ink limitations. These $2 \cdot n + s$ hyperplanes will be called colorant boundary planes. These planes will be defined such that points of the colorant domain are at the negative or zero side for all colorant boundary planes. If a colorant is contained by one or multiple colorant boundary planes and is at the negative side for all the other colorant boundary planes, the colorant lies at the boundary of the colorant domain. If the colorant is at the negative side for all colorant boundary planes, the colorant is inside the colorant domain.

The color gamut is defined as the set of colors obtained by printing all colorant combinations from the colorant domain.

Most color printers use a set of CMYK colorants for printing that is sometimes complemented with orange/red, green, blue/violet, light cyan, light magenta and/or light gray colorants.

The conversion of a color into a set of colorants for the purpose of its rendering on a printer is called "color separation" or simply "separation". It is recognized that this is a technically complex problem for a number of reasons.

In the first place does the conversion of a color into a colorant set generally not yield a unique solution: multiple colorant sets can be used to render a specific single color. Mathematically speaking the solution of the transformation of a color into a set of four or more colorants is said to be "undetermined". This state of being indeterminate can be resolved by imposing additional constraints on the range of otherwise available solutions. In order to avoid technical problems during the printing, the imposed constraints should be such that they preserve continuity, i.e. they should guarantee that any continuous path of colors in the color space is transformed into a range of colorant sets that form a continuous path in the colorant space.

A second problem is that the printable color gamut of a printer is never congruent with the color gamut of an image. In order to preserve the proper rendering of gradients and to avoid clipping, the color gamut of an image needs to be perceptually mapped onto the printable color gamut of a printer.

Printer Models

In the following we will consider subsets of the colorant domain, in which one of the colorants takes on different values, ranging from 0% to 100%, while the other colorants have a value of 0%. We will call these sets 1-ink subprocesses. In the same way colorant combinations where only m out of n inks are varying form an m-ink subprocess.

If however, one colorant of an n-dimensional colorant space is varying from 0 till 100%, and the remaining colorants are constant, and not all are equal to 0%, the subset is called a 1-ink process. If the domain of the 1-ink process lies at the boundary of the colorant domain, the 1-ink process is referred to as a 1-ink boundary process. In analogy m-ink processes and m-ink boundary processes can be defined.

An edge point p of the colorant domain is a point belonging to the colorant domain and for which, for every direction u in the colorant space, we can construct a line segment l with mid p and direction u, such that l is not entirely contained in the colorant domain. With no ink limitations present, these are just the colorant combinations where all values are either 0% or 100%. When ink limitations are present the set of edge points contains all the edge points of the unlimited colorant domain that lie within the ink limitation. Additional edge points are obtained as the intersection of the ink limitation plane with the colorant domain boundary.

In general an edge point in an n-dimensional colorant space is obtained by the intersection of n non-parallel colorant boundary planes; i.e. there are no 2 colorant boundary planes which are parallel.

In analogy with edge points, 1-dimensional edge processes can be defined by the intersection of n−1 non-parallel colorant boundary planes. And in general, p-dimensional edge processes are obtained by the intersection of n-p non-parallel colorant boundary planes.

Most color separation technologies are based on the use of a mathematical "printer model". Such a printer model predicts what color results if a set of colorants are printed on a specific substrate. Since a printer model acts "forward", i.e. predicts color as a function of amounts of colorants, it needs to be "inverted" for the purpose of color separation. This process is called "printer model inversion" or simply "model inversion".

Because model inversion tends to be a computationally intensive process, it is usually done only for a (rectangular) sampling of colors in the color space that form the entries of a look-up-table. The result of the model inversion for each entry is stored in the data points of the look-up-table and a fast linear interpolation technique is used for obtaining colorant sets for colors in between the entries.

A well-known printer model is provided by the "Neugebauer equations". These polynomials predict a color as an additive mixture the colors of the substrate, the primary colorants and of the various overlapping combinations in proportions that depend on the halftone dot percentages of the colorants. It is implicitly assumed in this model that the relative positions of the halftone dots are randomized. The coefficients of the polynomials are obtained by printing a "printer characterization target" that comprises a sufficient set of patches with known colorant combinations and measuring the color of these patches. By replacing in the Neugebauer polynomials the known colorant values of the printer target and the measured color values, a set of linear equations is obtained from which the unknown coefficients can be calculated using linear algebra.

Several variations of the original Neugebauer equations exist. In one variation ("spectral Neugebauer equations") the simple additive color mixing is replaced by the addition of spectral components. In yet another variation ("Neugebauer equations with localized coefficients"), the colorant space is subdivided into a set of contiguous rectangular sub-regions that each have their own set of coefficients. In yet another variation, each rectangular sub-region is further subdivided into a contiguous set of tetrahedrons for which a set of coefficients is obtained. The Neugebauer equations in that case degenerate to first order ("linear") polynomials.

More information on the Neugebauer equations and a technique for their inversion is found in the publication: Marc MAHY, et al. Inversion of the Neugebauer equations. *Color Research.* 6 Dec. 1996, vol. 21, no. 6, p. 404-411.

A well-known model that predicts light absorption and color as a function of colorant concentrations c inside a transmissive medium having a thickness X is the Beer-Lambert law. In FIG. 1 a light beam having an intensity $I_0$ passes through a medium 100 having a thickness X and containing a colorant concentration c. The colorant reduces the intensity $I_0$ to a value I. The value x refers to the distance in the medium measured from the top layer in a direction that is perpendicular to medium.

A very thin layer 101 having a thickness dx absorbs or scatters an amount of light di(x) that is proportional with the extinction coefficient $\epsilon$ of the colorant, the concentration c of the colorant and the intensity of the i(x) of the light beam at the position x:

$$\frac{di(x)}{x} = -c.\varepsilon.i(x) \tag{1}$$

Integrating the above differential equation over the distance X leads to the expression that is known as the Beer-Lambert law:

$$\frac{I}{I_0} = e^{-\varepsilon.c.X} \tag{2}$$

By applying Beer-Lambert law on the spectral components of an incident light beam, it is possible to predict not only how the intensity of the light beam changes, but also its spectral shape and the corresponding color.

$$\frac{I(\lambda)}{I_0(\lambda)} = e^{-\varepsilon(\lambda).c.X} \tag{3}$$

More information on the Beer-Lambert law is found in WYSZECKI, Günter, et al. Color Science: Concepts and Methods, Quantitative Data and Formulae. New York: John Wiley, 1982. ISBN 0471021067. p. 30-31.

If besides absorption also back scattering is to be modeled, the Kubelka-Munk model can be used. FIG. 2 shows a colorant layer 200 that is printed on an opaque background 201. The reflectance of the colorant layer is R, and the reflectance of the background layer is $R_g$. The colorant layer has a thickness X. Distances x are measured from the top of the background layer towards the top of the colorant layer.

In the Kubelka-Munk model a thin layer 202 can be identified having a thickness dx through which two light fluxes pass: a first flux i(x) that follows the direction of the component of an incident light beam that is perpendicular to the surface of the colorant layer and a second flux j(x) that follows the opposite direction.

Both light fluxes undergo attenuation due to absorption and back scattering. The quantity K denotes an absorption coefficient of a flux going through a thin layer having a thickness dx, i.e. the amount of flux that is lost due absorption. The quantity S denotes a backward scattering coefficient of a flux going by a thin layer having a thickness dx, i.e. the amount of the flux that is lost because it is reflected backwards. In a thin layer having a thickness dx at a position x the following differential equations are devised that describe the attenuation of both the flux i(x) and j(x):

$$\frac{di(x)}{dx} = (K+S).i(x) - S.j(x) \tag{4}$$

$$\frac{dj(x)}{dx} = -(K+S).j(x) - S.i(x) \tag{5}$$

Integrating this set of differential equations leads to the following expressions:

$$R = \frac{1 - R_g(a - b.ctgh(b.S.X))}{a - R_g + b.ctgh(b.S.X)} \tag{6}$$

wherein:

$$a = \frac{S+K}{S} \text{ and} \tag{7}$$

$$b = \sqrt{(a^2 - 1)} \tag{8}$$

"ctgh" refers to "cotangent hyperbolicus". The above equations are valid to calculate the reflectance of a colorant for the case of a narrow-band spectrum. By using the equations for the spectral components of the colorant layer and the background layer, it is possible to use the Kubelka-Munk model for calculating the spectrum of the reflected light beam and correspondingly its color. In that case the values for absorption coefficient $K(\lambda)$ and the scattering coefficient $S(\lambda)$ become dependent on the wavelength $\lambda$.

More information on the Kubelka-Munk model is found in WYSZECKI, Günter, et al. Color Science: Concepts and Methods, Quantitative Data and Formulae. New York: John Wiley, 1982. ISBN 0471021067. p. 221-222 and 785-786.
Dot Area Gain Dot area gain in the printing industry refers to the effect that the area of halftone dots in a printed image appears to be larger than the size of the corresponding halftone dots in the digital raster image. The main cause of this is a combination of physical ink spread that occurs during the printing and optical internal light reflection near the halftone dot boundaries in the substrate. Both effects cause that the printed halftone dots absorb more light, i.e. have a larger apparent dot area than is expected based on the area of the digital halftone dots.

If the digital dot area of a halftone is denoted as "a", the apparent dot area can be denoted as "a'". The dot gain "g" itself is then defined as g=a'−a.

The apparent dot area a' can be calculated by means of the Murray Davis equation:

$$a' = \frac{1 - 10^{(-D_t - D_p)}}{1 - 10^{(-D_s - D_p)}} \qquad (9)$$

in which: $D_t$ refers to a measured density of a halftone tint, $D_p$ refers to a measured density of the paper white and $D_s$ refers to the density of a solid color (a=100%) printed with the same ink as the halftone tint. In the above formula the densities are absolute densities.

When densities $D_t$ are measured relative to the paperwhite the value of $D_p$ becomes equal to zero and the above formula is simplified to:

$$a' = \frac{1 - 10^{(-D_t)}}{1 - 10^{(-D_s)}} \qquad (10)$$

For halftones printed with black ink a visual filter is used, for halftones printed with cyan ink a red filter, for halftones printed with magenta a green filter and for halftones printed with yellow ink a blue filter is used.

By plotting the apparent dot area a' as a function of the digital dot area a, a dot area curve is obtained, similar to the one shown in FIG. 4.

More information on the subject of dot area gain and the use of the Murray Davis equation is found in the publication SHARMA GAURAV, "Digital Color Imaging Handbook", CRC Press LLC, 2003, ISBN 0-8493-0900-X., pages 220-222.

The Murray Davis model was originally designed to describe the effect of a change of halftone dot area during printing on the density of the printed tint. In many printing processes, however, the amount of ink is not only (or even not at all) controlled by modulating a dot area, but also by changing the thickness of a printed ink or its density. In such cases it makes little sense to use the terms "digital dot area", "apparent dot area" or "dot area gain". Instead the more general terms: "digital tone value", "measured tone value" and "tone value increase" are preferable.
Regularization of a Printer Target In many cases the color data that is obtained from measuring a printer target cannot be used without a prior editing step that is also called a "regularization" step. There are several reasons that justify the need for a prior regularization.

A first reason is that many printer characterization targets comprise patches that suffer from physical defects such as scratches, stripes and banding (in the case of inkjet printing), uneven toning (in the case of toner based printing systems).

A second reason is related to gloss effects such as differences in specular reflection.

A third reason are the complex physical and optical effects during printing that result in unexpected behavior such as additivity failure, whereby a higher amount of colorant introduces an unexpected decrease in absorption, rather than the opposite as in a "well behaving" printing process. Such additively failure results in the three-dimensional equivalent of non-monotonicity in a one-dimensional print process, making model inversion much more difficult.

Such irregularities, when not properly dealt with, can result in discontinuities in color separations when smooth gradations are rendered.

A second problem is that irregularities in the printer characterization target translate in an irregular shape of the printable gamut when it is calculated. Such an irregular shape greatly complicates the process of mapping the color gamut of an image that is to be printed onto the color gamut of the printing process.

A solution to deal with these problems is provided in the publication WO 2013124369 A (AGFA GRAPHICS NV) 29 Aug. 2013. [46a] The U.S. Pat. No. 6,654,143, having a priority date of 1999 Oct. 28 and assigned to Xerox Corporation, teaches a method for using a printer target with a reduced number of color patches for characterizing a printer. A first (complete) printer characterization target is printed and measured (32). From the measurement a 16 primary Neugebauer model printer model is derived, with corrections for the measured optical (34) and physical (36) dot gain. The colors predicted by the model are compared with the measured colors for obtaining correction factors (44). When a different medium is used, a second (reduced) printer characterization target is printed and measured (46) that only comprises the 16 Neugebauer primaries. This model in combination with the corrections for optical (34) and physical (36) dot gain derived from the first model and the correction factors (44) is used for accurately predicting the color of a cmyk ink combination on the new substrate. Further embodiments disclose the use of the Kubelka-Munk model for predicting optical dot gain and the use of the spectral Neugebauer equations to improve the precision of colors predicted by the Neugebauer equations.

The U.S. Pat. No. 8,654,395, having a priority date of 2010 Feb. 12 and assigned to Heidelberger Druckmaschinen AG, discloses the use of a reduced printer target that is spectrally measured in combination with spectral models for accurately predicting color. A first type of model accurately predicts for each spectral band the tone value increase. A second type of model accurately predicts for each spectral band the color mixing behavior for various overprints of the inks. According to a preferred embodiment the segmented spectral Yule Nielsen Neugebauer model is used for the latter purpose.

Unresolved Problem

As mentioned before, the separation of a color into a colorant set is a complex process that involves defining and printing a printer characterization target, regularization of the measured colors of the target, calculating a printer model, calculating the color gamut of the printer, defining a color gamut transformation, inverting the model for the entries of a look-up table and storing the result in the look-up table.

This is a long and tedious work that requires a high degree of skill. There is a need for reducing the amount of work, for simplifying and for guiding the process to obtaining a printer model.

SUMMARY OF THE INVENTION

Methods according to preferred embodiments of the invention are disclosed below.

A system according to preferred embodiments of the invention are disclosed below.

A preferred embodiment of the invention deals with an improved method for printer characterization. More specifically the invention deals with a method for reducing the number of color patches that need to be printed and measured for the characterization of a printer.

For this purpose, a first (or primary) printer characterization target comprising a complete set of color patches is printed with a first printer using a first set of colorants on a first substrate. The color patches of the first printer characterization target are measured and stored in a first complete measurement file.

This first set of measurements is not necessarily obtained by printing and measuring but can also be obtained from reference data, such as the characterization data sets FOGRA39L or IFRA26L, etc. In another way the measurements can be calculated theoretically by making use of a mathematical model such as polynomials, or more preferably typical ink mixing models such as Lambert-Beer, Kubelka-Munk, Neugebauer, . . . .

From this first set of measurements, a model is derived describing the behavior of the 1-ink sub processes. This model allows us to predict the color of any colorant value of the 1-ink sub process, starting from the color values of the start and end point of the 1-ink sub process (normally 0% and 100%). We call such a model a tone value model. In a similar way the behavior between the end points of a 1-ink process, including 1-ink boundary processes and 1-dimensional edge processes, can be characterized by a tone value model.

More generally defined a tone value model is a set of curves used to define the interpolation behavior between two given points. These points are typically the end points of a 1-ink process. In an N-dimensional color space, we need N curves for interpolating the color between the end points of a 1-ink process.

In another approach the tone value models for the different 1-ink processes are defined theoretically, which is typically done for lithographic printing processes as described by ISO 12647/2 till ISO 12647/6.

A second (secondary) printer characterization target is printed using a second printer that uses a different set of colorants on a different substrate. This second printer characterization target comprises only a subset of the color patches in the first printer characterization target.

The color patches of the second printer characterization target are measured and stored in a reduced measurement file.

The tone value model is used to calculate the colors of the missing color patches in the second printer characterization target in order to obtain a complete measurement file for the second printer.

The invention significantly reduces the labor to obtain a printer model.

In the remaining paragraphs the invention is explained in more detail.

BRIEF DESCRIPTION OF THE DRAWINGS

FIG. 3 shows a preferred embodiment of a reduced printer characterization target.

FIG. 4 shows a plot of a tone value curve of a cyan ink on a white paper background.

FIG. 5 shows a plot of a tone value increase curve of a cyan ink on a white paper background.

FIG. 6 shows a plot of a tone value increase curve of a cyan ink on a background with 70% magenta and 70% yellow.

FIG. 7 shows an excerpt of a printer measurement file.

DETAILED DESCRIPTION OF THE PREFERRED EMBODIMENTS

Standard Printer Target

Figure 1:
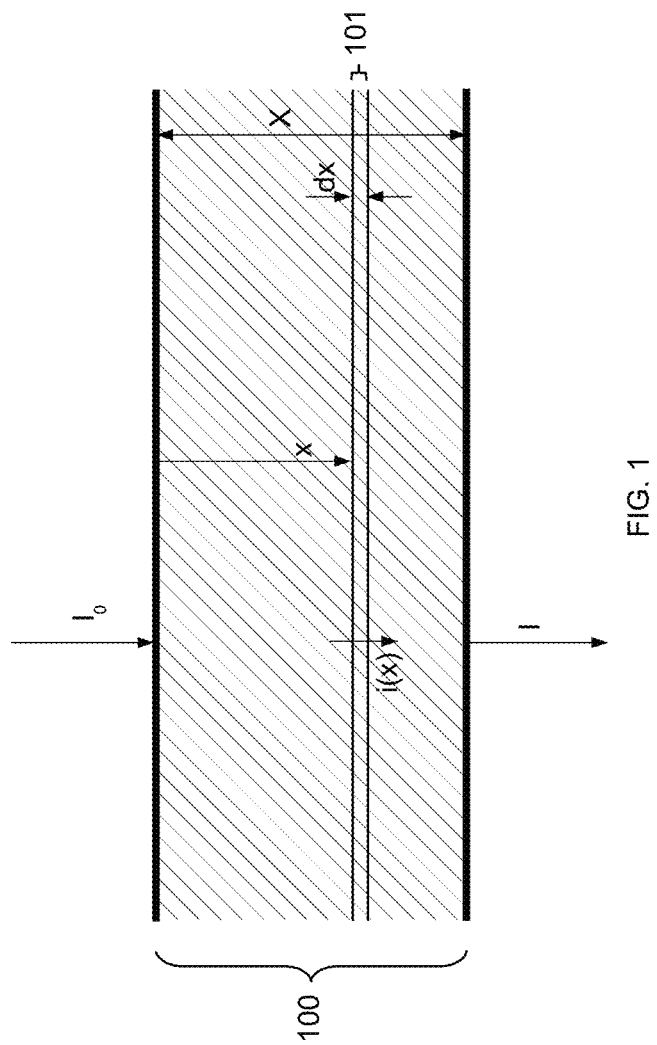
FIG. 1 shows a transmissive layer through which a light beam passes.
Figure 2:
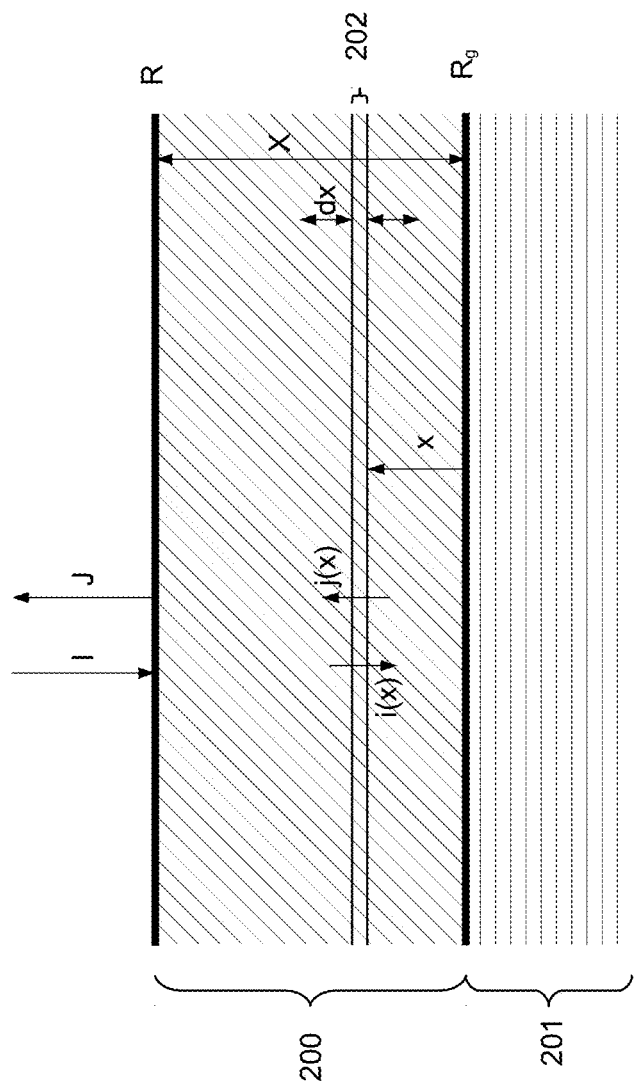
FIG. 2 shows a layer in which light is subject to absorption and backwards scattering.

A printer characterization target contains a number of color patches of which the colorant values are known. An example is the IT8.7/3 characterization target which is a widely accepted standard target in the graphic arts industry. Detailed information on this subject is found on the website of the "International Color Consortium" ("ICC") and by entering the search term "IT8.7/3".

Printer targets are also the subject of ISO standards.

ISO 12642-1:1996 (R2001) defines an input data file, a measurement procedure and an output data format for use in characterizing any four-color print process. The technical content is identical to ANSI IT8.7/3-1993.

ISO 12642-2:2006 defines a data set of ink value combinations that are intended to be used to characterize four-color process printing. This data set is not optimized for any printing process or application area but is robust enough for all general applications. The needs of publication, commercial, and package printing with offset, gravure, flexography, and other printing processes have been considered. While it is primarily aimed at process color printing with CMYK inks, it can also be used with any combination of three chromatic colored inks and a dark ink. It is an alternate to the ISO 12642-1 data set where more robust data is required. It forms the basis for the revised 4-color process printing target—IT8.7/4

Such a printer characterization target can be printed with a specific print process and the resulting color of the patches can be measured and stored as a table in a measurement file. An excerpt of such a printer measurement file is shown in FIG. 7. A single row in this table corresponds with a single color patch in the target. The first column is a row number, the second column a row and column position indicator in the printed target, the next four columns correspond with the cyan, magenta, yellow and black colorant tone values of a color patch, the next three columns with the CIE XYZ color values of the color patch as measured on the target, and the last three columns with corresponding the CIE Lab color values. In the excerpt shown in FIG. 7 the color patches correspond with combinations of 0%, 10%, 20% 40%, 70% 100% magenta with 70% cyan, 20% yellow, 0% black colorants.

In general, a printer target comprises color patches that correspond with different amounts of a first ink of an ink set, in combination with background colors that are combinations of amounts of the remaining inks in the ink set. Such a printer target is designated as a complete printer target, and the measurement file that corresponds with it a complete measurement file.

The measurement file also comprises in its header additional meta-data such as information on the measurement geometry, the standard illuminant (usually D50) that was used, the equipment that was used for measuring the patches, the print conditions such as the raster frequency, the inks that were used, the paper etc.

A complete measurement file contains all the necessary data to calculate the color gamut of the print process and a forward printer model.

Reduced Printer Target

According to a preferred embodiment of the current invention, a reduced printer characterization is used for obtaining a printer model.

FIG. 3 shows an example of such a reduced target. In this case the reduced characterization target comprises the following colorant combinations:
- the primary colorants (C, M, Y, K) in different amounts (300);
- the secondary colorant combinations (CM, CY, MY, CK, MK, YK) in different amounts (301);
- the colorant combinations (CMY) in different amounts (302) that correspond with neutral or near neutral colors;
- a set of colorant combinations that represent the maximum tone value sum ("TVS") boundary (303). In this specific example, the maximum tone value sum is 220%.

The reduced target should contain all edge points of the colorant domain, as they are necessary input to use the tone value model. Preferably also a step wedge is included of the 1-ink sub processes to model tone value of the different colorants.

The colors of a reduced printer characterization file can be measured and be stored in a reduced measurement file.

Tone Value Increase

As an example of a tone value model we now describe a model that characterizes the tone value increase of a 1-ink subprocess. The concept of tone value increase is mainly used in conventional printing processes as discussed in ISO 12647/2 till ISO 12647/6.

In remaining part of this text, we will use the symbols c, m, y and k to refer to a tone value of tints printed with respectively cyan, magenta, yellow and black inks.

According to the preferred embodiment of the current invention, tone value is not modeled by means of the Murray Davies equation which uses measured densities, but by using colorimetric data such as for example XYZ colorimetric data or spectral data. This is explained.

Consider a halftone tint printed with black ink. The digital tone value is denoted as k, whereas the measured tone value is denoted as k'. The CIE Y value $Y_k$ of such a tint can be predicted as an additive mixture of a portion (1−k') white paper having a CIE Y value equal to $Y_0$ and a portion k' of solid ink having a CIE Y value equal to $Y_1$:

$$Y_k = (1-k') \cdot Y_0 + k' \cdot Y_1 \quad (11)$$

Rearranging the above equation leads to an expression for the measured tone value k' of the tint:

$$k' = \frac{Y_k - Y_0}{Y_1 - Y_0} \quad (12)$$

FIG. 4 shows a plot of a tone value curve in which the measured tone value k' is plotted versus the digital tone value k for a series of halftone tints having tone values ranging from 0% to 100%.

In the above example the CIE Y values were used as a basis for calculating a tone value curve. In general the CIE XYZ primary should be selected that exhibits the widest contrast for a specific ink. For example, if a tone value curve is to be calculated for a cyan ink, preferably the CIE X primary will be used for that purpose. Similarly for a magenta ink the CIE Y primary will be used and for a yellow ink the CIE Z primary. More generally: for the purpose of measuring tone value, the CIE XYZ tristimulus is used that corresponds with the dominant absorption of an ink.

Mathematical Modeling of a Tone Value Curve

To enable smooth interpolation, it is advantageous to mathematically model a tone value curve. Two possible solutions for this purpose are the cubic spline interpolation model and polynomial modeling. The inventors have found that a fourth degree polynomial was perfectly suitable for modeling the tone value curves if the following additional constraints are imposed:
- the polynomial is required to pass through the begin (0%,0%) and end (100%,100%) points of the curve; and
- nowhere in the range from 0% to 100% digital tone value should the derivative of the tone value curve have a value lower than 0, because this would make the tone value curve non-monotonous.
- nowhere in the range from 0% to 100% digital tone value should the second derivative of the tone value curve have a value higher than 0 (this latter constraint is optional).

A tone value function that maps the digital tone value a to a measured tone value a' is denoted as:

$$a' = f(a) \quad (13)$$

In some instances it is advantageous not to model the measured tone value a' as a function of a digital tone value a, but rather the tone value increase itself. If the tone value increase for a given a tone value is denoted as g(a), then the following expression is easily devised:

$$g(a) = f(a) - a \quad (14)$$

The tone value increase can be graphically represented by means of a curve such as the one shown in FIG. 5.

Use of a Tone Value Curve to Predict CIE XYZ Tristimulus Values

If a tone value curve of a cyan ink was derived from a study of the CIE X values, then it is straightforward to calculate the CIE X tristimulus value for a given digital tone value c. The calculation involves two steps: first the digital tone value c is transformed into a measured tone value c' using formula (13), and next the measured tone value c' is transformed into a CIE X tristimulus value using the equation (11). This leads to the following expression in which $fX_c$ refers to the tone value function that is based on measurements of the CIE X tristimulus values of a cyan ink.

$$X_c = (1 - fX_c(c)) \cdot X_0 + fX_c(c) \cdot X_1 \quad (15)$$

So it is sufficient to know $X_0$, $X_1$ and the tone value curve $fX_c(c)$ to calculate the CIE $X_c$ tristimulus value for any digital tone value c.

A question that arises is if the tone value curve $fX_c(c)$ can also be used for the purpose of calculating the two remaining CIE tristimulus values Y and Z.

In this context, a first approach could be to simply assume that the non-dominant absorptions (as measured by the CIE Y or Z tristimulus values for a cyan ink, for example) would predict exactly the same increase as a function of digital tone value, and hence that the resulting tone value curves would also be identical. If this were true, the CIE Y and Z tristimulus values for a tint c could be simply calculated as:

$$Y_c = (1 - fX_c(c)) \cdot Y_0 + fX_c(c) \cdot Y_1 \quad (16)$$

and $$Z_c = (1 - fX_c(c)) \cdot Z_0 + fX_c(c) \cdot Z_1 \quad (17)$$

Experiments, however, have demonstrated that this approach, simple and elegant as it may seem, does not yield values that sufficiently correspond with the measured observations.

For this reason, an alternative approach was developed. According to this new approach, it is assumed that the tone value curves $fX_c(c)$, $fY_c(c)$ and $fZ_c(c)$ for the different tristimulus values still have the same overall shape, but that absolute amounts of tone value increases are allowed to be different. The effect can be modeled by introducing a scaling factor for scaling the two tone value increase curves corresponding with the two non-dominant absorptions relative to the tone value increase curve corresponding to the dominant absorption.

In the above example for the case of a cyan ink, the scaling factors for the tone value increase curves for predicting the CIE Y and Z tristimulus values could be called $kY_c$ and $kZ_c$. This leads to the following expressions (for the case of a cyan ink):

$$gX_c(c) = fX_c(c) - c \quad (18)$$

$$gY_c(c) = kY_c \cdot gX_c(c) \quad (19)$$

$$gZ_c(c) = kZ_c \cdot gX_c(c) \quad (20)$$

Or also:

$$fX_c(c) = kX_c \cdot fX_c(c) \quad (21)$$

wherein $kX_c = 1$ and $fX_c(c)$ based on measuring CIE X;

$$fY_c(c) = kY_c \cdot (fX_c(c) - c) + c \quad (22)$$

$$fZ_c(c) = kZ_c \cdot (fX_c(c) - c) + c \quad (23)$$

The value of $kY_c$ is mathematically determined using a regression technique that minimizes the least mean square error over the complete range of digital tone values in the target between the Y values as measured and the values as predicted by the above formula. In a similar way a value for $kZ_c$ is determined.

In summary, if—for the case of a cyan ink:
a tone value function $fX_c(c)$ is made available by measuring the CIE X tristimulus values corresponding with the dominant absorption, and;
if two scale factors are $kY_c$ and $kZ_c$ are calculated corresponding with the non-dominant absorptions, then the CIE XYZ tristimulus values can be predicted as follows:

$$X_c = (1 - fX_c(c)) \cdot X_0 + fX_c(c) \cdot X_1 \quad (24)$$

$$Y_c = (1 - fY_c(c)) \cdot Y_0 + fY_c(c) \cdot Y_1 \quad (25)$$

$$Z_c = (1 - fZ_c(c)) \cdot Z_0 + fZ_c(c) \cdot Z_1 \quad (26)$$

wherein:

$$fX_c(c) = kX_c \cdot (fX_c(c) - c) + c \quad (27)$$

wherein $kX_c = 1.0$ $$fY_c(c) = kY_c \cdot (fX_c(c) - c) + c \quad (28)$$

$$fZ_c(c) = kZ_c \cdot (fX_c(c) - c) + c \quad (29)$$

Similar models can be derived for the case of magenta, yellow and black inks. For every ink a tone value function $fX_c(c)$, $fY_m(m)$, $fZ_y(y)$, $fY_k(k)$ is obtained from measurements and a set of three scale factors of which one is equal to 1.0:
for the cyan ink: the scale factors are: $[kX_c, kY_c, kZ_c]$ in which $kX_c = 1.0$;
for the magenta ink: the scale factors are: $[kX_m, kY_m, kZ_m]$ in which $kY_m = 1.0$;
for the yellow ink: the scale factors are: $[kX_y, kY_y, kZ_y]$ in which $kZ_y = 1.0$;
for the black ink: the scale factors are: $[kX_k, kY_k, kZ_k]$ in which $kY_k = 1.0$;

Use of a Tone Value Increase Curve to Predict CIE Tristimulus Values of a Colorant in the Presence of Other Inks.

In the previous paragraphs the study of tone value increase was implicitly limited to the case of printing a single colorant on white paper. The inventors have investigated how the tone value increase of a colorant behaves when it is printed on a background wherein the other colorants have a non-zero value. An example is the tone value increase of a cyan colorant when it is printed on a background of, for example, magenta (m=70%) and yellow (y=70%) inks and no black ink (k=0%).

FIG. 5 shows a tone value increase curve that was measured of cyan ink on white paper (C=0; Y=0; K=0) whereas FIG. 6 shows a tone value increase curve of cyan printed on a combination of magenta ink (m=70%), yellow ink (y=70%) and no black ink (k=0%).

It appears that the shape of both tone value increase curves is very similar, but that the actual tone value increase of the cyan ink on a background of magenta and yellow inks is lower, more precisely and in this particular case, that it is approximately 75% as that for the cyan ink printed on white paper.

A similar observation was made when the tone value increase of the cyan was analyzed in the presence of other backgrounds comprising other combinations of amounts of magenta, yellow and black inks.

More in general, the inventors have found by analyzing tone value increase curves for different colorants on different backgrounds and using different printing processes, that the following was always approximately and sufficiently true:
The overall shape of the tone value increase curve of a specific colorant in a specific process was constant, independent of the background color;
The tone value increases themselves, however, were not always the same, in the sense that the tone value increases are usually lower when a background contains more ink.

This has lead the inventors to come up with a generalized tone value increase model in which the tone value increase curves of the pure inks serve as reference tone value increase curves and in which the other tone value increase curves (for cases in which colorant values of the background are not zero) are derived from the reference tone value increase curve by means of scaling factors k.

The background colors for a specific ink are preferably all (available) combinations of remaining three inks that are present in the target.

For example, if for a cyan ink the tone value increase curves of the pure ink on a white background are:

$$gX_c(c) \quad (30)$$

$$gY_c(c) \quad (31)$$

$$gZ_c(c) \quad (32)$$

Then for a combination of a set of magenta (m), yellow (y) and black digital tone values that make up a background, scaling factors $kX_c^{myk}$, $kY_c^{myk}$ and $kZ_c^{myk}$ can be determined that relate the tone value increase curves as a function of the curves for the white background:

$$gX_c^{myk}(c) = kX_c^{myk} \cdot gX_c(c) \quad (33)$$

$$gY_c^{myk}(c) = kY_c^{myk} \cdot gY_c(c) \quad (34)$$

$$gZ_c^{myk}(c) = kZ_c^{myk} \cdot gZ_c(c) \quad (35)$$

The values of the scale factors $kX_c^{myk}$, $kY_c^{myk}$ and $kZ_c^{myk}$ are determined using a regression technique that minimizes the least mean square error between the CIE X, Y and Z values that are measured in the target, and the ones that are predicted by means of the following tristimulus prediction model:

$$X_c = (1 - fX_c^{myk}(c)) \cdot X_{0myk} + fX_c^{myk}(c) \cdot X_{1myk} \quad (36)$$

$$Y_c = (1 - fY_c^{myk}(c)) \cdot Y_{0myk} + fY_c^{myk}(c) \cdot Y_{1myk} \quad (37)$$

$$Z_c = (1 - fZ_c^{myk}(c)) \cdot Z_{0myk} + fZ_c^{myk}(c) \cdot Z_{1myk} \quad (38)$$

wherein:

$$fX_c^{myk}(c) = kX_c^{myk} \cdot (fX_c(c) - c) + c \quad (39)$$

$$fY_c^{myk}(c) = kY_c^{myk} \cdot fY_c(c) - c) + c \quad (40)$$

$$fZ_c^{myk}(c) = kZ_c^{myk} \cdot (fZ_c(c) - c) + c \quad (41)$$

The expressions 36-41 are very similar in nature to the expressions 24-29. Both take the tone value function as based on measurements of the dominant absorption of the pure cyan ink, and use a scale factor to derive other tone value functions for predicting CIE tristimulus values.

The difference however is that the tristimulus values of the "paperwite" ($X_0$, $Y_0$ and $Z_0$) in expressions 24-26 here are replaced by the tristimulus of the "background" color ($X_{0myk}$, $Y_{0myk}$ and $Z_{0myk}$). Similarly, the tristimulus values of the (pure) solid ink ($X_1$, $Y_1$ and $Z_1$) have been replaced by the tristimulus values ($X_{1myk}$, $Y_{1myk}$, $Z_{1myk}$) of the solid ink as it is printed on this background.

Obviously, the exact same approach can be used for obtaining scale factors of tone value curves for predicting:
tone value functions for a magenta ink in the presence of a background comprising cyan, yellow and black inks:
tone value functions for a yellow ink in the presence of a background comprising cyan, magenta and black inks:
tone value functions for a black ink in the presence of a background comprising cyan, magenta and yellow inks.

Tone Value Model

According to a preferred embodiment a tone value model comprises the following information:
for each ink (c, m, y, k) there is a tone value function (($fX_c(c)$, $fY_m(m)$, $fZ_y(y)$, $fY_k(k)$), preferably a fourth degree polynomial, that describes the tone value for the ink, based on measurements of the tristimulus value (X, Y or Z) that corresponds to the dominant absorption of the ink;

there is also a look up table that comprises for each ink in combination with each background (myk, cyk, cmk, cmy combinations including paper white) a set of three scale factors ($kX_c^{myk}$, $kY_c^{myk}$, $kZ_c^{myk}$, $kX_m^{cyk}$, $kY_m^{cyk}$, $kZ_m^{cyk}$, $kX_y^{cmk}$, $kY_y^{cmk}$, $kZ_y^{cmk}$, $kX_k^{cmy}$, $kY_k^{cmy}$, $kZ_k^{cmy}$) for deriving functions corresponding with the CIE XYZ tristimulus values.

Using the Reduced Printer Characterization Target

It is now disclosed how a reduced printer target can be used in combination with the tone value increase model of a first printer to reconstruct a virtual complete printer measurement file for a second printer, without having to print, measure and process the complete printer characterization target for said second printer.

The goal is to obtain a complete virtual measurement file for the second printer.

1) obtain the tone value model using the complete measurement file of the first printer.

2) obtain the tone value increase curves for each one of the primary inks from the reduced measurement file that corresponds with the second printer using the alternative-approach using tone value curves to predict CIE tristimulus values described above.

3) obtain for a combination of cyan, magenta, yellow and black inks a set of CIE XYZ tristimulus values. This is achieved by consulting the tone value model and:
using the tone value curve for the cyan ink on a background of magenta, yellow and black inks, yielding a first set of CIE XYZ values;
using the tone value curve for the magenta ink on a background of cyan, yellow and black inks, yielding a second set of CIE XYZ values;
using the tone value curve for the yellow ink on a background of cyan, magenta and black inks, yielding a third set of CIE XYZ values;
using the tone value curve for the black ink on a background of cyan, magenta and yellow inks, yielding a fourth set of CIE XYZ values.

Each of the four sets of tristimulus values is obtained by using a tone value increase curve to predict CIE tristimulus values of a colorant in the presence of other inks described above,whereby the tone value curves are used that were obtained in step 2 and whereby the scaling factors are used that were stored in the tone value model of the first printer.

4) average the four sets of three CIE tristimulus value obtained in the previous step to obtain a representative CIE XYZ set of tristimulus value for the selected combination of cyan, magenta, yellow and black inks. The averaged CIE XYZ values are stored in the virtual complete printer measurement file for a second printer.

The steps 3) to 4) are repeated until the virtual complete printer measurement file for the second printer is completely populated.

It is obvious that we need to populate first the 1-dimensional edge processes of the colorant cube before we can calculate the color values of the 2-dimensional edge processes that we need to populate the 2-dimensional edge boundaries, before we can calculate the color values of 3-dimensional edge processes, etc. till all edge processes are defined. In a last step the internal colorant points will be predicted.

Dealing with the Tone Value Sum ("TVS")

Until now in this text, it was implicitly assumed that the range of digital tone values was always in a range from 0% to 100%. This is rarely the case, because when excess ink is printed on a location, physical and optical effects start deteriorating the quality of the print. Depending on the characteristics of the printing process, the tone value sum ("TVS") i.e. the sum of the digital tone values of the c, m, y and k inks should not exceed a value in the range between 180% and 340%.

This has implications in the context of the current invention.

In the context of the tone value model, we are applying the tone value curve between 0% and 100% of ink. So we need a method of extrapolation to obtain the color values from the edge points that lie outside the ink limited colorant domain. We give an example of how this can be done. Let us take an ink limitation of 240%. We can predict the 300% edge point (100% c, 100% m, 100% y, 0% k) from the edge points (0% c, 100% m, 100% y, 0% k) and (40% c, 100% m, 100% y, 0% k) by rearranging equations (36)-(38). Alternatively, we can predict the same edge point from edge points (100% c, 0% m, 100% y, 0% k) and (100% c, 40% m, 100% y, 0% k). We can also predict the same edge point from the points (100% c, 100% m, 0% y, 0% k) and (100% c, 100% m, 40% y, 0% k). The final color values for the missing edge point can be obtained by averaging these three set of values. Likewise other missing edge points of the full colorant domain can be obtained.

In the context of a model that allows for interpolation along directions in the ink limiting planes, it is not necessary to use an extrapolation technique, because we have no need of the edge points outside the ink limitations to do the model interpolation. Alternatively we can supplement our tone value model with a means of interpolation in the ink limiting plane(s). This can e.g. be a linear interpolation between the edge points in the ink limitation plane. Also this interpolation can be part of the tone value model.

Other Embodiments

The current approach to predict colors is based on 1-dimensional interpolation schemes. However, a similar approach can be developed based on multidimensional interpolation, e.g. by making use of polynomials or typical ink mixing models such as Neugebauer, Lambert-Beer, Kubelka-Munk.

In the description of the preferred embodiment, tone value functions are used that predict CIE XYZ tristimulus values as a function of tone value. As mentioned before, the method works just as well for tristimulus values that are based on filters that are a linear transformation of the CIE XYZ color matching functions. In fact, the invented method can also be used for multispectral color values that are non-linear functions of the CIE XYZ color matching functions, such as for example narrow band densitometric multispectral color values.

The method is also applicable if not tristimulus values are used, but a set of N (N>1) spectral values instead. In the latter case, scaling factors are calculated and used for each spectral component as opposed for each tristimulus value.

In the description of the preferred embodiments the term ink is used, but the method works also in combination with any colorant such as toner.

What is claimed is:

1. A method for predicting CIE tristimulus values of a color printed with inks on a second printer, the method comprising the steps of:
   printing with a first printer on a first substrate a first characterization target including a first set of color patches and measuring the CIE tristimulus values of the first set of color patches to obtain a first set of measurements; and
   calculating from the first set of measurements a complete tone value model of the first printer, the complete tone value model including:
      for each primary ink of the first printer, a tone value function for the CIE tristimulus value that corresponds with a dominant absorption of the primary ink of the first printer;
      for each primary ink in combination with a background including remaining inks or paper white in the first characterization target, a set of three scale factors, one for each of the CIE tristimulus values, that relate the tone value function that corresponds with the dominant absorption of the primary ink with the tone value function of the primary ink printed in combination with the background;
   printing with the second printer on a second substrate a second characterization target including a second set of color patches that includes color patches of the primary inks of the second printer;
   measuring the CIE tristimulus values of the second set of color patches;
   calculating from the measurements of the second set of color patches for each primary ink a tone value function that describes a relationship between a tone value and the CIE tristimulus value that corresponds with the dominant absorption;
   calculating for a color printed with the primary inks of the second printer from the tone value functions in combination with the set of three scale factors in a look up table:
      a first set of CIE tristimulus values by using a tone value curve for a first primary ink on a background of a combination with the remaining inks;
      a second set of CIE tristimulus values by using a tone value curve for a second primary ink on a background of a combination with the remaining inks;
      a third set of CIE tristimulus values by using the tone value curve for a third primary ink on a background of a combination with the remaining inks; and
      a fourth set of CIE tristimulus values by using a tone value curve for a fourth primary ink on a background of a combination with the remaining inks; and
   averaging the four sets of three CIE tristimulus values to obtain a representative CIE XYZ set of tristimulus values for a selected combination of the color printed with the primary inks.

2. The method according to claim 1, further comprising the steps of:
   repeating the steps of calculating and averaging the four sets of three CIE tristimulus values with various combinations of inks to obtain a virtual printer model for the second printer.

3. The method according to claim 2, further comprising the steps of:
   inverting the virtual printer model to provide an inverted printer model;
   using the inverted printer model to separate a color image to provide a separated color image;
   printing the separated color image.

* * * * *